United States Patent [19]

Bender et al.

[11] Patent Number: 4,968,104

[45] Date of Patent: Nov. 6, 1990

[54] CATERPILLAR TRACK

[75] Inventors: Rolf Bender, Bad Vilbel; Horst Pfuderer, Dietzenbach, both of Fed. Rep. of Germany

[73] Assignee: INA Walzlager Schaeffler KG, Fed. Rep. of Germany

[21] Appl. No.: 18,201

[22] Filed: Feb. 24, 1987

[30] Foreign Application Priority Data

Mar. 20, 1986 [DE] Fed. Rep. of Germany ....... 3609334

[51] Int. Cl.$^5$ ........................................... B62D 55/205
[52] U.S. Cl. .................................. 305/58 R; 305/41; 305/11
[58] Field of Search .................... 305/11, 39, 41, 42, 305/43, 58 R, 58 PC; 474/209; 384/582, 585, 903

[56] References Cited

U.S. PATENT DOCUMENTS

| 2,007,152 | 7/1935 | Allee | 384/582 |
| 2,428,060 | 9/1947 | Albrecht | 474/209 |
| 3,279,868 | 10/1966 | Jacob | 474/209 X |
| 3,399,004 | 8/1968 | Rohde et al. | 384/585 X |
| 3,883,194 | 5/1975 | Pitner | 384/582 |

FOREIGN PATENT DOCUMENTS

| 2239149 | 2/1975 | France | 384/582 |
| 2009685 | 6/1979 | United Kingdom | 305/41 |

Primary Examiner—Russell D. Stormer
Attorney, Agent, or Firm—Bierman and Muserlian

[57] ABSTRACT

A caterpillar track comprising chain links hinged to one another by bolts, each bolt traversing boreholes of adjacent chain links and being directly supported in the borehole of one chain link while being supported in the other chain link by resilient annular elements made of polymeric material cross-linked with the bolt and frictionally engaging the borehole walls, the improvement comprising supporting the bolt (1) in the boreholes (4) of the other chain link (2) also by at least one rolling bearing (9,16) arranged between adjacent resilient annular elements (5,6).

7 Claims, 2 Drawing Sheets

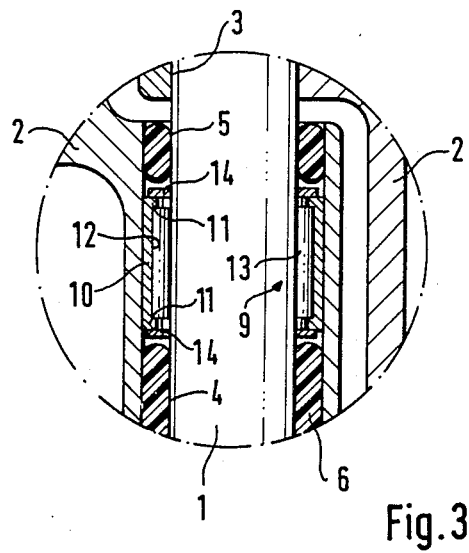
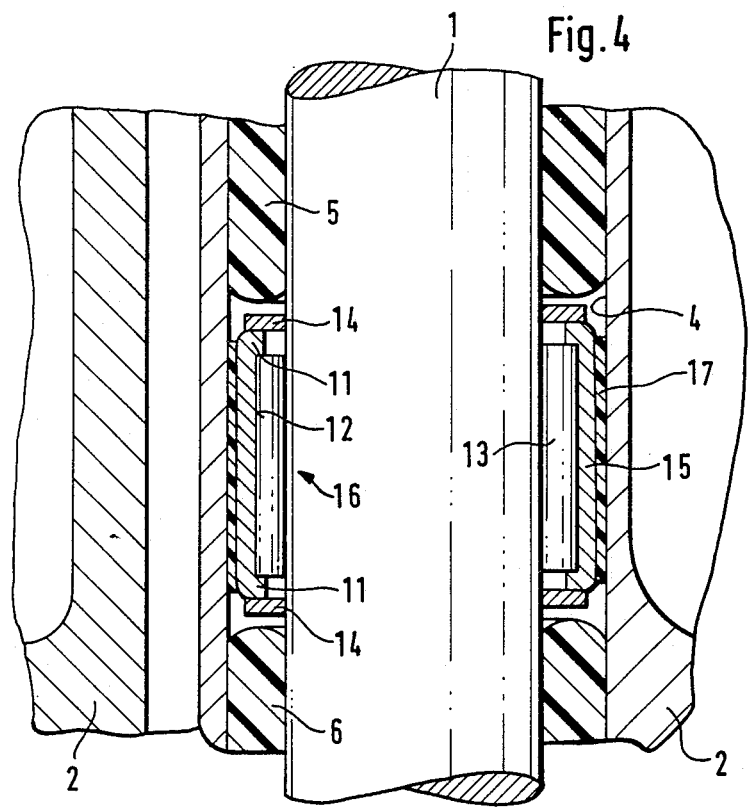

CATERPILLAR TRACK

STATE OF THE ART

Caterpillar tracks comprised of chain links hinged to each other by bolts wherein each bolt traverses boreholes of adjoining chain links and is directly supported in the boreholes of the one chain link while being supoorted in the other one chain link by resilient annular elements of polymeric material cross-linked with the bolt e.g. by vulcanizing and frictionally engaged with the walls of the boreholes are known. In such Caterpillar tracks which are preferably used for cross-country motor vehicles, the resilient annular elements are not only stressed by the traction force acting on the Caterpillar track but are also subjected during run of the track about the deflection pulleys and over rough territory to strains which originate from the resulting flexure between adjacent chain links.

To avoid a premature breakdown of the Caterpillar track because of failure of the resilient annular elements, each second chain link in known Caterpillar tracks is designed as an extremely short intermediate link which directly supports a respective bolt in its borehole. This measure almost halves the flexure to be absorbed by the resilient annular elements asociated with each bolt in comparison to the conditions in a track without intermediate links so that the resilient annular elements withstand the combined strain over a sufficient period. A disadvantage of the known Caterpillar tracks resides in the considerable limitation of the admissible flexure upon given traction force, and in the considerable increase of the mass of the Caterpillar track due to the necessity of intermediate links and additional bolts. Moreover, additional costs for material, manufacture and assembly are incurred.

OBJECTS OF THE INVENTION

An object of the invention is to provide a Caterpillar track of the above-stated kind which does not require intermediate links and additional bolts but still permits greater flexure in comparison to known Caterpillar tracks without any negative impact on the durability This and other objects and advantages of the invention will become obvious from the following detailed description.

THE INVENTION

In the Caterpillar track of the invention comprising chain links hinged to one another by bolts, each bolt traversing boreholes or adjacent chain links and being directly supported in the borehole of one chain link while being supported in the other chain link by resilient annular elements made of polymeric material cross-linked with the bolt and frictionally engaging the boreholes walls, the improvement comprises supporting the bolt (1) in the boreholes (4) of the other chain link (2) also by at least one rolling bearing (9,16) arranged between adjacent resilient annular elements (5,6).

By providing at least one rolling bearing arranged between adjoining resilient annular elements for additionally supporting the bolt in the boreholes of the other chain link, the problem is simply solved. Through this measure, the resilient annular elements are completely relieved from the traction force and are only subjected to the strain due to the flexure obtained between adjacent chain links so that no intermediate links with additional bolts are required in view of the minor strain on the resilient annular elements. However, the Caterpillar track of the invention is still suitable for great flexures without diminishing the durability in comparison to known Caterpillar tracks. Since the rolling bearings are arranged between adjoining resilient annular elements connected with the bolts and the walls of the boreholes, foreign matter or other otherwise detrimental material are prevented from penetrating into the space for the rolling bearings, thus resulting in a high durability of the roller bearing.

According to a modification of the invention, the rolling bearing designed as a needle roller bearing comprised of a thin walled outer race with a bearing raceway limited by a radially inwardly directed flange at each side and needle rollers directly rolling on the outer surface of the bolt. Through this means, the required structural space is actually not increased in comparsion to a Caterpillar track without any rolling bearing, and the required guidance of the roller bearing is guaranteed.

One embodiment of the invention uses disks which are fixed to the bolts axially beyond the border of the outer race in immediate vicinity thereof and having such an outer diameter that they radially overlap the flange of the outer race. This measure is especially of importance when the resilient annular elements are attached to the bolts through vulcanizing. Since the needle roller bearings are arranged between the resilient annular elements, it is necessary to have them arranged on the bolts prior to the vulcanizing step. The disks prevent a leakage from the needle roller bearings of lubricant which becomes low viscoisty due to the temperatures encountered during vulcanizing.

To prevent inadmissible edge loads of the needle rollers in case of flexures of the bolts, according to one embodiment of the invention, a thin layer of a resilient polymeric material is provided between the outer surface of the outer race and the wall of the borehole supporting the latter to allow the outer race to slant within the borehole in accordance with flexure of the bolt. Advantageously, the layer is of annular shape and cross-linked with the outer race, especially through vulcanizing.

According to a last modification of the invention, the bolt is directly supported in the boreholes at the one end of each chain link while being supported in the boreholes at the other end by the resilient annular elements and the needle roller bearings. The Caterpillar track can then be assembled of completely identical chain links.

Referring now to the drawings:

FIG. 3 is the detail A of FIG. 1 on an enlarged scale and

FIG. 4 is a sectional view of a detail of a Caterpillar track of the invention on a further enlarged scale.

Figure 1:
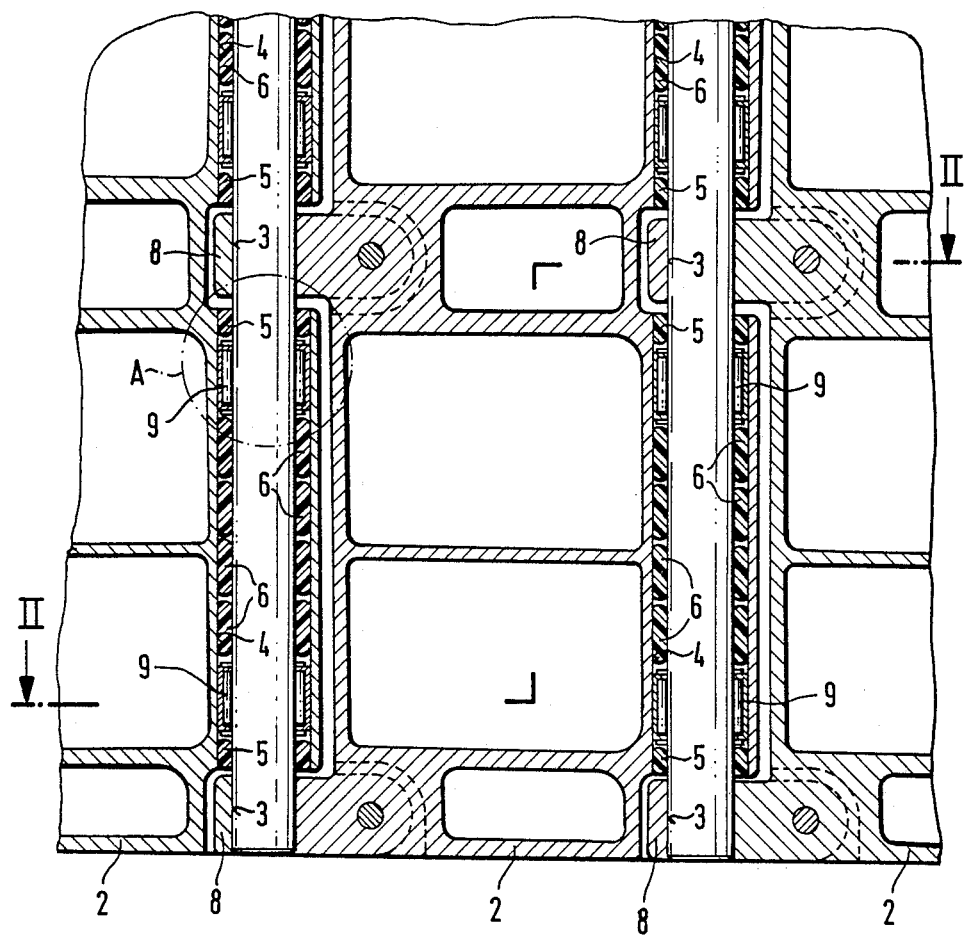
FIG. 1 is a sectional view along line I—I in FIG. 2 of a portion of a Caterpillar track of the invention and FIG. 2 is a sectional view along line II—II of FIG. 1.
Figure 2:
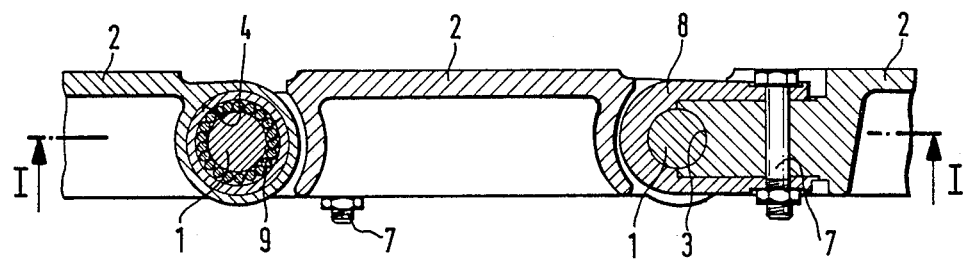

As can be seen from FIGS. 1 to 3, the Caterpillar track of the invention is comprised of chain links 2 hinged with each other through bolts 1 so that one bolt 1 extends through boreholes 3 and 4 of adjoining chain links 2. Each bolt 1 is supported directly within the borehole 3 of one of two adjoining chain links 2 while being supported in the borehole 4 of the other one by resilient annular elements 5 and 6 made of synthetic rubber. The latter are cross-linked with the respective bolt 1 and frictionally engage with the walls of the respective boreholes 4. The boreholes 3 which directly support the bolt 1 are defined by the respective chain link 2 and connectors 8 affixed thereto by screws. 7.

Each bolt 1 is further supported in the boreholes 4 by needle roller bearings 9 arranged between adjacent elements 5 and 6. The arrangement of the needle roller bearing 9 between the elements 5 and 6 which are respectively cross-linked with the bolt 1, on the one hand, and frictionally engage the walls of the boreholes 4, on the other hand, leads to an extremely effective sealing of the needle roller bearing 9 against penetration of contamination and loss of lubricant and is not subjected to any wear since the elements 5 and 6 are not in sliding engagement with the bolt 1 or the walls of the boreholes 5.

As can be seen from FIG. 3, the needle roller bearings 9 are each comprised of a thin-walled outer race 10 with a bearing raceway 12 defined by a flange 11 directed radially inwardly at each side and along which the needle rollers 13 run which also roll directly on the outer surface of the respective bolt 1. Frictionally engaged with the respective bolt 1 are disks 14 which are arranged axially beyond the flange 11 of the races 10 in their immediate vicinity and have an outer diameter of such dimension that they radially overlap the flanges 11. The chain links 2 are all identical, i.e. they include boreholes 3 at their one end for directly supporting one bolt 1 and boreholes 4 at their other end for supporting another bolt 1 by elements 5 and 6 needle bearings 9 arranged between the latter.

The Caterpillar track illustrated in FIG. 4 differs from the previously described one by arranging between the outer surface of the outer race 15 of the needle roller bearing 16 which supports the bolt 1 in the borehole 4 of the chain link 2, and its wall, a thin layer 17 or a resilient polymeric material which has an annular shape and is attached by vulcanizing to the outer surface of the outer race 15.

The design and number of the elements 5 and 6 as well as of the rolling bearing 9 and 16 are only exemplified as is the design of the chain links 2 and the connector 8 and, thus, depending on the purpose, they can be modified within the scope of the invention in a different manner than illustrated in the embodiment. It is to be understood that the invention is intended to be limited only as defined in the appended claims.

What We claim is:

1. A Caterpillar track comprising chain links hinged to one another by bolts, each bolt traversing boreholes of adjacent chain links and being directly supported in the borehole of one chain link while being supported in the other chain link by resilient annular elements made of polymeric material cross-linked with the bolt and frictionally engaging the borehole walls, the improvement comprising supporting the bolt (1) in the boreholes (4) of the other chain link (2) also by at least one rolling bearing (9,16) arranged between adjacent resilient annular elements (5,6).

2. A Caterpillar track of claim 1 wherein the rolling bearing is a needle roller bearing (9,16) comprised of a thin walled outer race (10,15) with a bearing raceway (12) defined with a radially inwardly directed flange (11) at each side thereof and needle rollers (13) rolling directly on the outer surface of the bolt (1).

3. A Caterpillar track of claim 2 wherein disks (14) are axially secured to bolt (1) axially beyond the flanges (11) of the outer race (10,15) in immediate vicinity thereof, the disks having an outer diameter of such dimension that the disks radially overlap the flange (11).

4. A Caterpillar track of claim 2 wherein a thin layer (17) of resilient polymeric material is provided between the outer surface of the outer race (15) and the wall of borehole (4) supporting the latter.

5. A Caterpillar track of claim 4 wherein the layer (11) has an annular shape and is cross-linked to outer race (15).

6. A track of claim 5 wherein the cross-linking is effected by vulcanization.

7. A Caterpillar track of claim 1 wherein, at one end of each chain link (2), a bolt (1) is directly supported in the boreholes (3) and at the other end of each chain link (2), a bolt (1) is supported in the boreholes (4) by means of the resilent annular elements (5,6) and the rolling bearings (9,16).

* * * * *